(12) United States Patent
Barkan et al.

(10) Patent No.: US 12,450,456 B1
(45) Date of Patent: Oct. 21, 2025

(54) OVERLAPPING EXPOSURE OF CELL FRAMES IN A MULTI-FOV SYSTEM

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/911,187

(22) Filed: Oct. 9, 2024

(51) Int. Cl.
 *G06K 7/10* (2006.01)
 *G06K 7/14* (2006.01)
 *H04N 23/74* (2023.01)

(52) U.S. Cl.
 CPC ..... *G06K 7/10732* (2013.01); *G06K 7/10752* (2013.01); *G06K 7/1408* (2013.01); *H04N 23/74* (2023.01)

(58) Field of Classification Search
 CPC .......................... G06K 7/10732; H04N 23/74
 USPC ................................................... 235/462.42
 See application file for complete search history.

(56) References Cited

U.S. PATENT DOCUMENTS

| | | | |
|---|---|---|---|
| 2005/0162638 A1* | 7/2005 | Suzuki | G01C 3/08 356/5.01 |
| 2021/0012070 A1* | 1/2021 | He | G06K 7/12 |

* cited by examiner

Primary Examiner — Toan C Ly
(74) Attorney, Agent, or Firm — Yuri Astvatsaturov (57) ABSTRACT

Methods for overlapping exposure of frames in imaging systems with multiple fields of view. An example imaging system includes: one or more illumination sources configured to illuminate two or more FOVs, one or more imaging sensors corresponding to the two or more FOVs, one or more processors, and one or more memories including computer-executable instructions that, when executed by the one or more processors, cause the imaging system to perform a data capture sequence including one or more data capture periods, wherein: each data capture period includes a first illuminated exposure period associated with a first FOV, at least one data capture period of the one or more data capture periods includes a first non-illuminated exposure period associated with the first FOV, and each data capture period includes a second illuminated exposure period associated with a second FOV.

20 Claims, 6 Drawing Sheets

OVERLAPPING EXPOSURE OF CELL FRAMES IN A MULTI-FOV SYSTEM

BACKGROUND

Conventional techniques for barcode scanning applications generally employ scanners with image sensors capable of operating at high frame rates to analyze objects moving across the scanners' fields of view.

High intensity illumination and efficient pixel integration (exposure) are typically necessary for continuously acquiring sufficient quality frames at a high frame rate. However, barcodes and other decodable symbologies presented on digital displays, of a mobile device, for example, are often obscured by the high intensity illumination typically used in the conventional techniques. Such digital artifacts are increasingly interleaved with physical symbologies passing through a scanners field(s) of view, leading to decreased efficiency and accuracy in symbology recognition for high frame rate scanners. The conventional techniques struggle to address these issues while maintaining the ability to accurately and efficiently recognize physical symbologies affixed to objects. Such techniques often result in items needing to be scanned more than once, and consequently result in higher power consumption and require streaming larger amounts of data.

SUMMARY

In an embodiment, the present invention is an imaging system comprising: one or more processors; one or more illumination sources configured to illuminate two or more fields of view (FOV) associated with a scanning region, the two or more FOVs including at least a first FOV and a second FOV; one or more imaging sensors corresponding to the first FOV and the second FOV and configured to capture imaging data; and one or more memories including computer-executable instructions stored thereon that, when executed by the one or more processors, cause the imaging system to perform a data capture sequence including one or more data capture periods, wherein: each data capture period includes a first illuminated exposure period over which the one or more illumination sources illuminate the first FOV and the one or more imaging sensors capture first illuminated imaging data corresponding to the first FOV, at least one data capture period of the one or more data capture periods includes a first non-illuminated exposure period over which the one or more illumination sources do not illuminate the first FOV and the one or more imaging sensors captures first non-illuminated imaging data corresponding to the first FOV, and each data capture period includes a second illuminated exposure period over which the one or more illumination sources illuminate the second FOV and the one or more imaging sensors capture second illuminated imaging data corresponding to the second FOV.

In a variation of this embodiment, a duration of each data capture period is inversely proportional to a framerate of the imaging system.

In another variation of this embodiment, at least one data capture period of the one or more data capture periods includes a second non-illuminated exposure period over which the one or more illumination sources do not illuminate the second FOV and the one or more imaging sensors capture second non-illuminated imaging data corresponding to the second FOV.

In another variation of this embodiment, the one or more imaging sensors correspond to a third FOV and a fourth FOV and the one or more illumination sources are further configured to illuminate the third FOV and the fourth FOV, and wherein: each data capture period further includes a third illuminated exposure period over which the one or more illumination sources illuminate the third FOV and the one or more imaging sensors capture third illuminated imaging data corresponding to the third FOV, one or more data capture periods include a second non-illuminated exposure period over which the one or more illumination sources do not illuminate the third FOV and the one or more imaging sensors captures second non-illuminated imaging data corresponding to the third FOV, and each data capture period includes a fourth illuminated exposure period over which the one or more illumination sources illuminate the fourth FOV and the one or more imaging sensors capture fourth illuminated imaging data corresponding to the fourth FOV.

In another variation of this embodiment, the imaging system further comprises: an upright window, a horizontal window, and a center line perpendicular to the upright window and bisecting the horizontal window, and wherein: each of the first FOV, the second FOV, the third FOV, and the fourth FOV are directed towards respective particular sides of an object, and the particular sides of the object include: a side of the object facing the upright window, a side of the object facing the horizontal window, a side of the object right of the center line and parallel to the center line, or a side of the object left of the center line and parallel to the center line.

In another variation of this embodiment, at least a portion of the scanning region is illuminated by the one or more illumination sources throughout a duration of the data capture sequence.

In another variation of this embodiment, the one or more imaging sensors are configured to capture imaging data corresponding to the first FOV through a first portion of a window and capture imaging data corresponding to the second FOV through a second portion of the window.

In another variation of this embodiment, the first FOV is at least partially oriented towards a first direction and the second FOV is at least partially oriented towards a second direction, wherein the first direction is opposite to the second direction.

In another variation of this embodiment, the second FOV overlaps with the first FOV.

In another variation of this embodiment, the computer-executable instructions, when executed by the one or more processors, further cause the imaging system to: identify a symbology affixed to an object depicted in: (i) the illuminated imaging data corresponding to the first FOV, or (ii) the illuminated imaging data corresponding to the second FOV; and decode the symbology affixed to the object.

In another variation of this embodiment, the computer-executable instructions, when executed by the one or more processors, further cause the imaging system to: identify a symbology presented on a display of an external computing device depicted in: (i) the non-illuminated imaging data corresponding to the first FOV, or (ii) the non-illuminated imaging data corresponding to the second FOV; and decode the symbology presented on the display of the external computing device.

In another variation of this embodiment, the one or more imaging sensors include a single split view imaging sensor including a first portion corresponding to the first FOV and a second portion corresponding to the second FOV.

In another variation of this embodiment, the one or more imaging sensors include a first imaging sensor corresponding to the first FOV and a second imaging sensor corresponding to the second FOV.

In another variation of this embodiment, a symbology passing through the scanning region during the data capture sequence is positioned within a plane within 86 degrees of normal to each of: a first central axis of the first FOV, and a second central axis of the second FOV.

In another embodiment, the present invention is a computer implemented method for performing a data capture sequence including one or more data capture periods, comprising: during each of the one or more data capture periods: illuminating, by one or more illumination sources, a first field of view (FOV) associated with a scanning region of an imaging system for a first illuminated exposure period; capturing, by one or more imaging sensors, first illuminated imaging data corresponding to the first FOV during the first illuminated exposure period; illuminating, by the one or more illumination sources, a second FOV associated with the scanning region of the imaging system for a second illuminated exposure period; and capturing, by the one or more imaging sensors, second illuminated imaging data corresponding to the second FOV during the second illuminated exposure period; and during at least one data capture period of the one or more data capture periods: capturing, by the one or more imaging sensors, first non-illuminated imaging data corresponding to the first FOV during a first non-illuminated exposure period over which the one or more illumination sources do not illuminate the first FOV.

In a variation of this embodiment, the duration of each data capture period is inversely proportional to a framerate of the imaging system.

In a variation of this embodiment, the computer implemented method further comprises: during at least one data capture period of the one or more data capture periods: capturing, by the one or more imaging sensors, second non-illuminated imaging data corresponding to the second FOV during a second non-illuminated exposure period over which the one or more illumination sources do not illuminate the second FOV.

In a variation of this embodiment, the computer implemented method further comprises: during each of the one or more data capture periods: illuminating, by the one or more illumination sources, a third FOV associated with the scanning region of the imaging system for a third illuminated exposure period; capturing, by the one or more imaging sensors, third illuminated imaging data corresponding to the third FOV during the third illuminated exposure period; illuminating, by the one or more illumination sources, a fourth FOV associated with the scanning region of the imaging system for a fourth illuminated exposure period; and capturing, by the one or more imaging sensors, fourth illuminated imaging data corresponding to the fourth FOV during the fourth illuminated exposure period; and during at least one data capture period of the one or more data capture periods: capturing, by the one or more imaging sensors, second non-illuminated imaging data corresponding to the third FOV during a second non-illuminated exposure period over which the one or more illumination sources do not illuminate the third FOV.

In another variation of this embodiment, the imaging system comprises: an upright window, a horizontal window, and a center line perpendicular to the upright window and bisecting the horizontal window, and wherein: each of the first FOV, the second FOV, the third FOV, and the fourth FOV are directed towards respective particular sides of an object, and the particular sides of the object include: a side of the object facing the upright window, a side of the object facing the horizontal window, a side of the object right of the center line and parallel to the center line, or a side of the object left of the center line and parallel to the center line.

In a variation of this embodiment, at least a portion of the scanning region is illuminated by the one or more illumination sources throughout the duration of the data capture sequence.

In another variation of this embodiment, the one or more imaging sensors are configured to capture imaging data corresponding to the first FOV through a first portion of a window and capture imaging data corresponding to the second FOV through a second portion of the window.

In another variation of this embodiment, the first FOV is at least partially oriented towards a first direction and the second FOV is at least partially oriented towards a second direction, wherein the first direction is opposite to the second direction.

In another variation of this embodiment, the second FOV overlaps with the first FOV.

In a variation of this embodiment, the computer implemented method further comprises: identifying, by one or more processors, a symbology affixed to an object depicted in: (i) the first illuminated imaging data corresponding to the first FOV, or (ii) the second illuminated imaging data corresponding to the second FOV; and decoding, by the one or more processors, the symbology affixed to the object.

In a variation of this embodiment, the computer implemented method further comprises: identifying, by one or more processors, a symbology presented on a display of an external computing device depicted in: (i) the first non-illuminated imaging data corresponding to the first FOV, or (ii) the second non-illuminated imaging data corresponding to the second FOV; and decoding, by the one or more processors, the symbology presented on the display of the external computing device.

In another variation of this embodiment, the one or more imaging sensors include a single split view imaging sensor including a first portion corresponding to the first FOV and a second portion corresponding to the second FOV.

In another variation of this embodiment, the one or more imaging sensors include a first imaging sensor corresponding to the first FOV and a second imaging sensor corresponding to the second FOV.

In another variation of this embodiment, a symbology passing through the scanning region during the data capture sequence is positioned within a plane within 86 degrees of normal to each of: a first central axis of the first FOV, and a second central axis of the second FOV.

In yet another embodiment, the present invention is a non-transitory computer readable medium containing program instructions, for performing a data capture sequence including one or more data capture periods, that when executed, cause a computer to: during each of the one or more data capture periods: illuminate, by one or more illumination sources, a first FOV associated with a scanning region of an imaging system for a first illuminated exposure period; capture, by one or more imaging sensors, first illuminated imaging data corresponding to the first FOV during the first illuminated exposure period; illuminate, by the one or more illumination sources, a second FOV associated with the scanning region of the imaging system for a second illuminated exposure period; and capture, by the one or more imaging sensors, second illuminated imaging data corresponding to the second FOV during the second illuminated exposure period; and during at least one data capture period of the one or more data capture periods: capture, by the one or more imaging sensors, non-illuminated imaging data corresponding to the first FOV during a first non-illuminated exposure period over which the one or more illumination sources do not illuminate the first FOV.

In a variation of this embodiment, the duration of each data capture period is inversely proportional to a framerate of the imaging system.

In a variation of this embodiment, the program instructions, when executed by the one or more processors, further cause the computer to: during at least one data capture period of the one or more data capture periods: capture, by the one or more imaging sensors, second non-illuminated imaging data corresponding to the second FOV during a second non-illuminated exposure period over which the one or more illumination sources do not illuminate the second FOV.

In a variation of this embodiment, the program instructions, when executed by the one or more processors, further cause the computer to: during each of the one or more data capture periods: illuminate, by the one or more illumination sources, a third FOV associated with the scanning region of the imaging system for a third illuminated exposure period; capture, by the one or more imaging sensors, third illuminated imaging data corresponding to the third FOV during the third illuminated exposure period; illuminate, by the one or more illumination sources, a fourth FOV associated with the scanning region of the imaging system for a fourth illuminated exposure period; and capture, by the one or more imaging sensors, fourth illuminated imaging data corresponding to the fourth FOV during the fourth illuminated exposure period; and during at least one data capture period of the one or more data capture periods: capture, by the one or more imaging sensors, second non-illuminated imaging data corresponding to the third FOV during a second non-illuminated exposure period over which the one or more illumination sources do not illuminate the third FOV.

In another variation of this embodiment, the imaging system comprises: an upright window, a horizontal window, and a center line perpendicular to the upright window and bisecting the horizontal window, and wherein: each of the first FOV, the second FOV, the third FOV, and the fourth FOV are directed towards respective particular sides of an object, and the particular sides of the object include: a side of the object facing the upright window, a side of the object facing the horizontal window, a side of the object right of the center line and parallel to the center line, or a side of the object left of the center line and parallel to the center line.

In a variation of this embodiment, at least a portion of the scanning region is illuminated by the one or more illumination sources throughout the duration of the data capture sequence.

In another variation of this embodiment, the one or more imaging sensors are configured to capture imaging data corresponding to the first FOV through a first portion of a window and capture imaging data corresponding to the second FOV through a second portion of the window.

In another variation of this embodiment, the first FOV is at least partially oriented towards a first direction and the second FOV is at least partially oriented towards a second direction, wherein the first direction is opposite to the second direction.

In another variation of this embodiment, the second FOV overlaps with the first FOV.

In a variation of this embodiment, the program instructions, when executed by the one or more processors, further cause the computer to: identify, by one or more processors, a symbology affixed to an object depicted in: (i) the first illuminated imaging data corresponding to the first FOV, or (ii) the second illuminated imaging data corresponding to the second FOV; and decode, by the one or more processors, the symbology affixed to the object.

In a variation of this embodiment, the program instructions, when executed by the one or more processors, further cause the computer to: identify, by one or more processors, a symbology presented on a display of an external computing device depicted in: (i) the first non-illuminated imaging data corresponding to the first FOV, or (ii) the second non-illuminated imaging data corresponding to the second FOV; and decode, by the one or more processors, the symbology presented on the display of the external computing device.

In another variation of this embodiment, the one or more imaging sensors include a single split view imaging sensor including a first portion corresponding to the first FOV and a second portion corresponding to the second FOV.

In another variation of this embodiment, the one or more imaging sensors include a first imaging sensor corresponding to the first FOV and a second imaging sensor corresponding to the second FOV.

In another variation of this embodiment, a symbology passing through the scanning region during the data capture sequence is positioned within a plane within 86 degrees of normal to each of: a first central axis of the first FOV, and a second central axis of the second FOV.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present aspects may relate to, inter alia, an imaging system for overlapping exposure of frames in multiple fields of view (FOV). The imaging system provided herein may perform a data capture sequence including one or more data capture periods, the data capture periods including capturing illuminated and/or non-illuminated imaging data for at least two intersecting or overlapping FOV of the example imaging system.

For instance, various types of objects may pass through the FOV(s) of an example imaging system, such as a mobile device equipped with a display that is presenting a decodable symbology, an item affixed with a physical decodable symbology, a printed symbology, etc. However, conventional imaging systems are not suitably configured to capture imaging data for a digital symbology presented on a display. As mentioned above, conventional imaging systems operate at a high frame rate (e.g., a frame rate sufficient for scanning scenarios) and typically employ high intensity illumination to optimize the ability to scan physical symbologies (e.g., printed symbologies, such as a barcode, affixed to an object or on a label or paper). Moreover, such high intensity illumination produces glare on displays, and accordingly, capturing imaging data of a digital symbology presented on a display of a mobile device may be inefficient and inaccurate.

The example imaging system and associated data capture sequences provided herein introduce non-illuminated exposure periods into a data capture sequence, thereby improving the efficiency and performance of the example imaging systems to recognize digital symbologies over the conventional techniques. While some conventional imaging systems may be capable of capturing non-illuminated imaging data periodically, by deactivating associated illumination sources, for example, such conventional imaging systems are not equipped to frequently capture non-illuminated imaging data without degrading the ability to recognize physical symbologies. The example imaging system performs data capture sequences that include at least one data capture period that includes a non-illuminated exposure period, thereby preventing glare from obscuring a digital symbology for at least a portion of the duration of a data capture sequence. Additionally, introducing non-illuminated exposure periods in this manner ensures that at least one FOV of the imaging system is illuminated throughout the duration of a data capture sequence, thereby maintaining the imaging systems ability to recognize physical symbologies.

Advantageously, capturing illuminated and non-illuminated imaging data in this manner improves the object recognition capabilities of the imaging system by reducing the likelihood of misidentifying, or failing to identify, digital symbologies while maintaining the ability of the imaging system to identify physical symbologies. Moreover, the disclosed invention improves the processing capabilities of conventional imaging systems. Additionally, by improving over the object recognition capabilities of conventional imaging systems, an exemplary imaging system can capture fewer images in the aggregate, thereby reducing power consumption and expending fewer computational resources.

Figure 1:
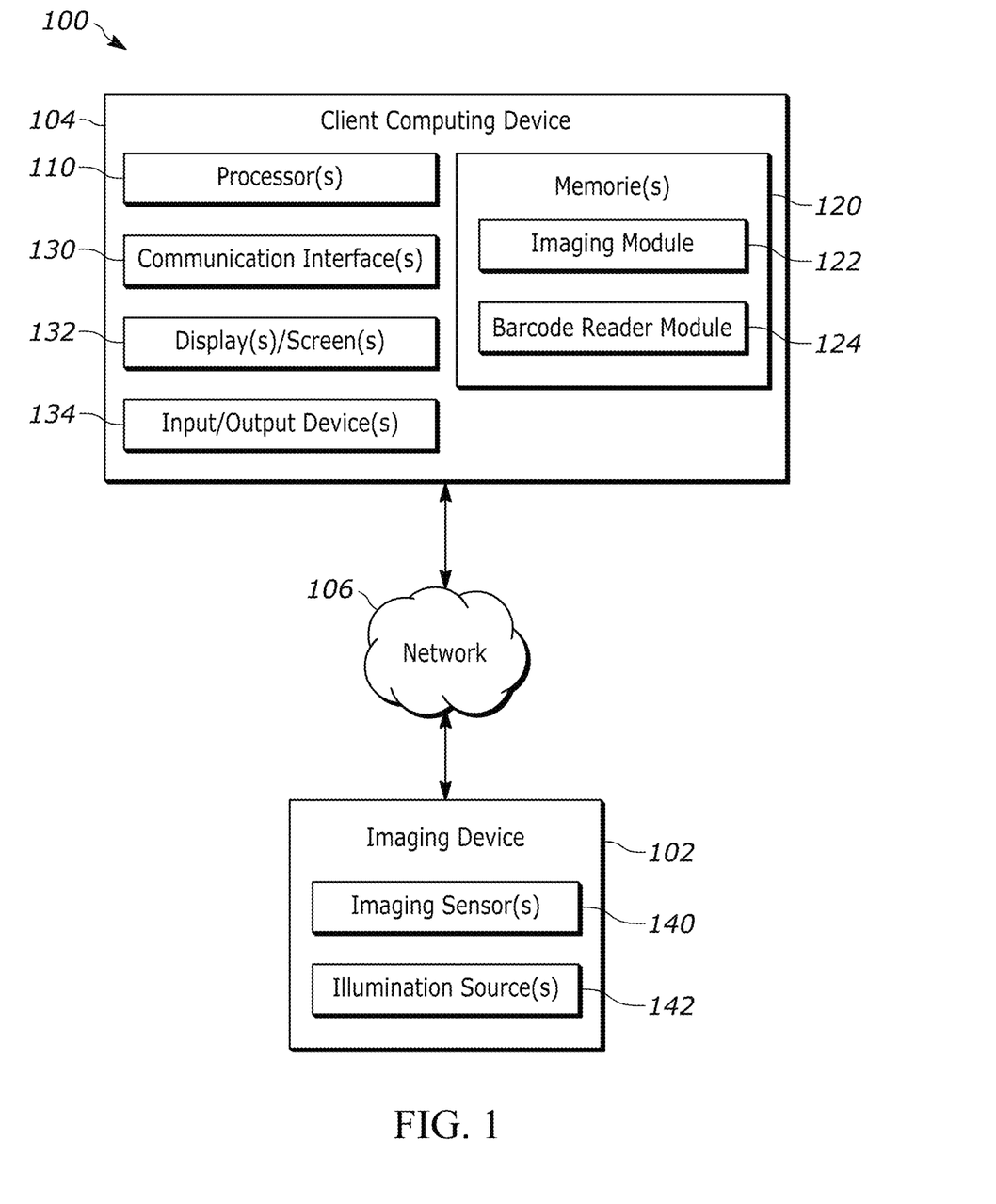
FIG. 1 is a block diagram of an example logic circuit for implementing example methods and/or operations for overlapping frame exposure in a multi-FOV system, in accordance with some embodiments described herein.
Figure 5:
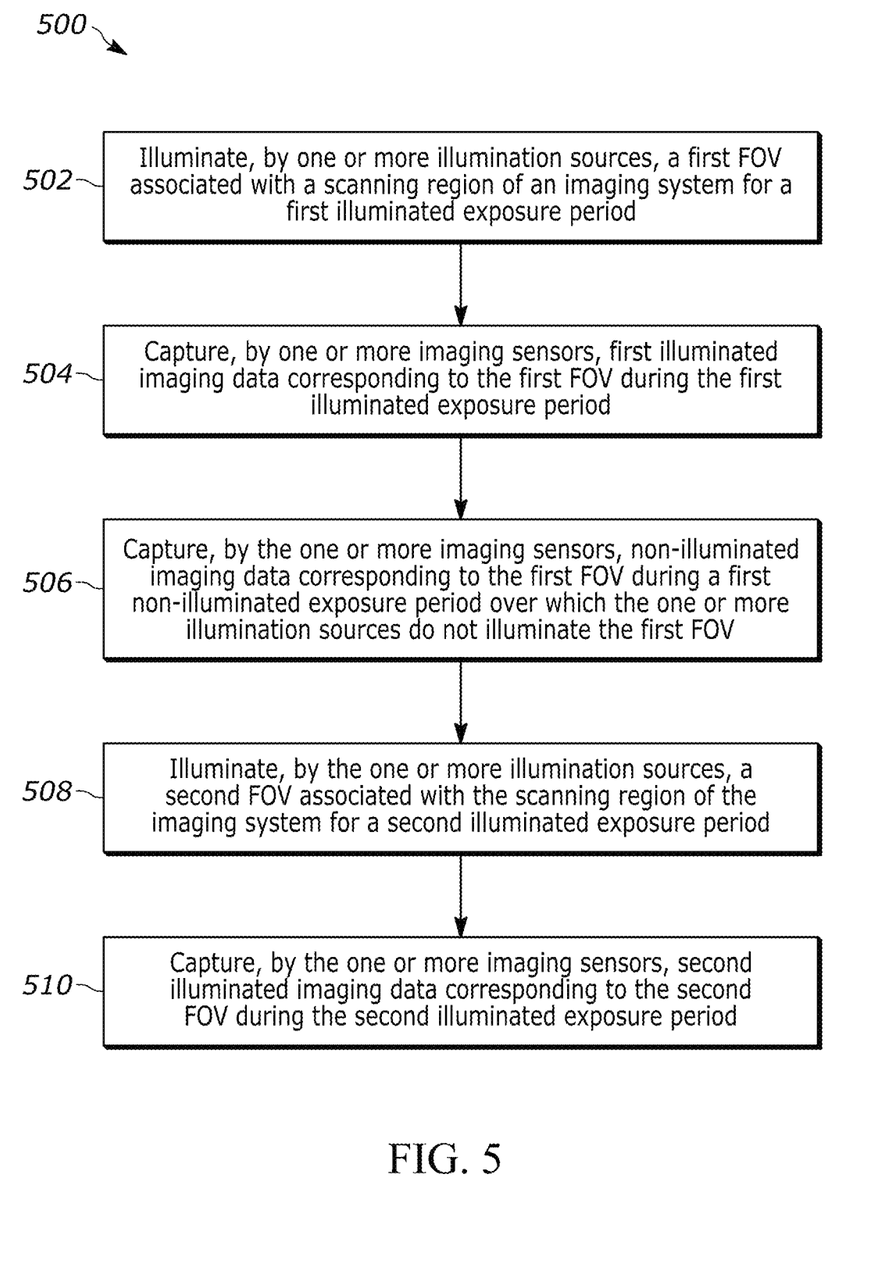
FIG. 5 depicts an exemplary computer-implemented method for overlapping frame exposure, in accordance with some embodiments described herein.

Referring now to the drawings, FIG. 1 is a block diagram representative of an example computing environment 100 capable of implementing the example methods and/or operations described herein, including, for example, one or more steps of the method 500 of FIG. 5. The computing environment 100 of FIG. 1 includes an imaging device 102, a client computing device 104, and a network 106. The exemplary network 106 of FIG. 1 may be a single communication link directly connecting the client computing device 104 and the imaging device 102 (e.g., a direct wireless link), or one or more networks 106 may include multiple links and/or communication networks of one or more types (e.g., one or more wired and/or wireless local area networks (LANs), and/or one or more wired and/or wireless wide area networks (WANs) such as the Internet, public networks, private networks, etc.). For ease of reading herein (and not for limitation purposes), the one or more networks 106 may be referred to using the singular tense.

The example imaging device 102 of FIG. 1 includes one or more imaging sensors 140 and one or more illumination sources 142. In some embodiments, the imaging device 102 may be included in a scanning station (e.g., a bi-optical or "bi-optic" scanning station, a self-checkout station, etc.), a machine vision imaging system, an object recognition device, etc. The imaging device 102 may be communicatively coupled to the client computing device 104 via, for example, one or more wired connections and/or one or more wireless connections and over one or more networks (e.g., over the network 106 via the communication interfaces 130). In some embodiments, the imaging device 102 may be integrated with the client computing device 104. Additionally or alternatively, the one or more imaging sensors 140 and/or the illumination sources 142 may be integrated with the client computing device 104.

The one or more imaging sensors 140 may correspond to two or more fields of view (FOV) and may be configured to capture illuminated imaging data (e.g., capture imaging data corresponding to a FOV illuminated by the one or more illumination sources 142) and non-illuminated imaging data (e.g., capture imaging data corresponding to a FOV not illuminated by the one or more illumination sources 142) associated with the two or more FOVs. The imaging sensors 140 may be configured to receive and execute instructions (e.g., image acquisition parameters) from the memory 120 (e.g., initiated by the imaging module 122) that cause the imaging sensors 140 to capture imaging data associated with the two or more FOVs during illuminated and non-illuminated exposure periods (e.g., exposure periods over which the one or more illumination sources 142 illuminate or do not illuminate associated FOV) associated with a data capture sequence. In some embodiments, the imaging sensors 140 may correspond to a first FOV and a second FOV. For example, a single split-view imaging sensor 140 may have two distinct FOV (e.g., the first FOV and the second FOV). As another example, two imaging sensors 140 may respectively correspond to the first FOV and the second FOV. In some embodiments, the imaging sensors 140 may correspond to a first FOV, a second FOV, a third FOV, and a fourth FOV. For example, a single split-view imaging sensor 140 may correspond to the first FOV and the second FOV, and two imaging sensors 140 may correspond to the third FOV and the fourth FOV. It should be noted that other configurations of the one or more imaging sensors 140 are possible. In some embodiments, the two or more FOVs may be associated with a scanning region of the imaging device 102. For example, a scanning region of the imaging device 102 may be an area where objects are swiped through, or placed in, so that symbologies (e.g., barcodes) affixed thereto or displayed thereon (e.g., a digital display presenting a symbology) the objects may be identified.

The one or more illumination sources 142 may be configured to illuminate the two or more FOVs associated with the one or more imaging sensors 140. For example, the illumination sources 142 may be configured to illuminate the first FOV, the second FOV, the third FOV, and/or the fourth FOV. As another example, an individual illumination source of the one or more illumination sources 142 does not illuminate an associated FOV of the two or more FOVs during a non-illuminated exposure period, while the remaining illumination sources of the one or more illumination sources 142 illuminate the remaining FOV of the two or more FOVs during the non-illuminated exposure period. The illumination sources 142 may be configured to receive and execute instructions from the memory 120 (e.g., initiated by the imaging module 122) that cause the illumination sources 142 to illuminate a FOV of the two or more FOVs over illuminated exposure periods during a data capture period of a data capture sequence. For example, the instructions received from the memory 120 may cause the illumination sources 142 to activate and deactivate at particular times throughout a data capture period.

The example client computing device 104 of FIG. 1 includes one or more processors 110, one or more memories 120, one or more communication interface(s) 130, one or more display(s)/screen(s) 132, and one or more input/output (I/O) device(s) 134. The memories 120 includes an imaging module 122 and a barcode reader module 124.

The example client computing device 104 of FIG. 1 may be an individual server, a group (e.g., cluster) of multiple servers, a computing device (e.g., a scanning station, a personal computer, a laptop, a smart phone, a tablet, a wearable device, etc.), or another suitable type of computing device or system (e.g., a collection of computing resources). In some aspects of the present invention, the client computing device 104 may be the property of a customer, a company, an organization, etc.

The processors 110 may include, for example, one or more microprocessors, controllers, and/or other suitable types of processors. The example client computing device 104 of FIG. 1 includes memories 120 (e.g., volatile memory, non-volatile memory) accessible by the processor 110 (e.g., via a memory controller). The example processor 110 interacts with the memory 120 to obtain, for example, machine-readable instructions stored in the memory 120 corresponding to, for example, the operations represented by the flowcharts of this disclosure (e.g., the flowchart 500 of FIG. 5). Additionally or alternatively, machine-readable instructions corresponding to the example operations described herein may be stored on one or more removable media (e.g., a compact disc, a digital versatile disc, removable flash memory, etc.) that may be coupled to the computing environment 100 to provide access to the machine-readable instructions stored thereon.

The one or more communication interface(s) 130 may enable communication with other machines (e.g., the imaging device 102) via, for example, one or more wired connections and/or one or more wireless connections and over one or more networks (e.g., over the network 106). The example communication interface 130 includes any suitable type of communication interface(s) (e.g., wired and/or wireless interfaces) configured to operate in accordance with any suitable protocol(s). For example, the communication interfaces 130 may be configured to transmit and receive data using a suitable wired communication protocol such as an Ethernet protocol, a USB protocol, a UART protocol, an I2C protocol, a SPI protocol, or wireless communication protocols such as a Bluetooth protocol, a Wi-Fi® (IEEE 802.11 standard) protocol, a near-field communication (NFC) protocol, a cellular (e.g., GSM, CDMA, LTE, WiMAX, etc.) protocol, a peer-to-peer wireless protocol, a short-range wireless protocol, and/or other suitable wired or wireless communication protocols. In some embodiments, for data throughput and efficiency reasons, the communication interface 130 may use a combination of such protocols.

The displays/screens 132 may present or display information to a user. The displays/screens 132 may use any suitable display technology (e.g., LED, OLED, LCD, etc.), and in some embodiments may be integrated with I/O device 134 as a touchscreen display. Further, display 132 and I/O device 134 may combine to form an integral user interface to enable a user of the client computing device 104 to interact with graphical user interfaces (GUIs) provided by the client computing device 104. In some embodiments, the display 132 may not be integral to the client computing device 104 and may receive instructions from the client computing device 104 via wired and/or wireless transmissions over communication interface 130, for example.

The input/output (I/O) devices 134 may enable receipt of user input and communication of output data to the user. The input/output (I/O) devices 134 may include one or more suitable types of user input devices, such as keyboards, touch screen displays, microphones, mice, touchpads, and/or any suitable types of remote and/or local user input devices. Further, the I/O devices 134 may include one or more suitable types of output devices, such as touch screen displays, speakers, and the like. For example, the I/O devices 134 and/or the displays/screens 132 may enable a user to review illuminated imaging data and/or non-illuminated imaging data. As another example, the I/O devices 134 and/or the displays/screens 132 may enable a user to review an indication of an object, or other associated information, identified via: a symbology associated with the object, an object recognition application stored on the memory 120, a machine vision application stored on the memory 120, etc. In some embodiments, the I/O devices 134 may include one or more local interfaces, and/or may include one or more remote interfaces that are communicatively connected to the client computing device 104 via the network 106 (e.g., that are provided by an application, web browser, or other software executing on a device of a user) and/or a wired connection.

Returning to the memories 120, the imaging module 122 may include computer-executable instructions for performing a data capture sequence including one or more data capture periods. The imaging module 122 may generate and/or store one or more sets of image acquisition parameters including illuminated exposure acquisition parameters and non-illuminated exposure acquisition parameters. In some embodiments, the imaging module 122 may include instructions that cause the client computing device 104 to send the image acquisition parameters (e.g., the illuminated exposure acquisition parameters and the non-illuminated exposure acquisition) to the one or more imaging sensors 140 and/or the one or more illumination sources 142 (e.g., via the network 106). As mentioned above, the imaging sensors 140 and the illumination sources 142 may be configured to receive and execute image acquisition parameters. For example, the illuminated exposure acquisition parameters may cause the illumination sources 142 to illuminate a FOV of the two or FOV over an illuminated exposure period and may cause the imaging sensors 140 to capture illuminated imaging data corresponding to the FOV of the two or more FOVs during the illuminated exposure period. As another example, the non-illuminated exposure acquisition parameters may cause the imaging sensors 140 to capture non-illuminated imaging data corresponding to a FOV of the two or more FOVs during a non-illuminated exposure period, over which the illumination sources 142 do not illuminate the FOV of the two or more FOVs. Phrased another way, the imaging module 122 may include instructions that cause particular illumination sources 142 to be deactivated at predetermined times (e.g., on a periodic basis, a stochastic basis, on an intermittent basis, on a probabilistic basis, etc.) during non-illuminated exposure periods. Generally, the imaging module 122 may include instructions that cause at least a portion of a scanning region associated with the imaging device 102 to be illuminated by the illumination sources 142 throughout the duration of the data capture sequence, e.g., such that at least one FOV directed toward the scanning region is illuminated at any given time throughout the duration of the data capture sequence, thereby maintaining the ability of the imaging device 102 to capture illuminated imaging data and recognize physical symbologies throughout the capture sequence.

Expanding on these examples, each data capture period of a data capture sequence may include a first illuminated exposure period and a second illuminated exposure period respectively associated with a first FOV and a second FOV of the two or more FOVs, whereas at least one data capture period of the data capture sequence may include a non-illuminated exposure period associated with the first FOV or the second FOV. Further, the first illuminated exposure period, the second illuminated exposure period, and the first non-illuminated exposure period may correspond to respective sets of instructions included in the imaging module 122, and/or included in a set of data capture sequence instructions (e.g., generated by and/or stored in and/or transmitted by the imaging module 122). As another example, with regard to the data capture sequence described above, at least one data capture period may additionally include a second non-illuminated exposure period associated with the first FOV or the second FOV (e.g., whichever FOV the first non-illuminated exposure period is not associated with). As yet another example, the one or more imaging sensors 140 may also correspond to a third FOV and a fourth FOV. Continuing with this example, each data capture period of a data capture sequence may include a third illuminated exposure period and a fourth illuminated exposure period respectively associated with the third FOV and the fourth FOV, and at least one data capture period may include a second non-illuminated exposure period associated with the third FOV or the fourth FOV. In some embodiments, the imaging module 122 may include instructions for various sequences of data capture periods of a data capture sequence including varying amounts of illuminated exposure periods and non-illuminated exposure periods. Specific data capture sequences and associated data capture periods are discussed elsewhere herein.

The barcode reader module 124 may include computer-executable instructions for decoding symbologies depicted within image features of interest. Additionally or alternatively, the barcode reader module 124 may include instructions for determining an identification of an object associated with the symbology (e.g., by decoding the symbology), and may include instructions for communicating the identification of the object to other components of the computing environment 100 (e.g., another computing device, the displays/screens 132, etc.). For example, an object passing through a FOV of one of the imaging sensors 140 may be affixed with a physical symbology which may be decoded via the barcode reader module 194. As another example, a computing device including a digital display that is presenting a digital symbology passing through a FOV of one of the imaging sensors 140 may be decoded via the barcode reader module 194.

Figure 2A:
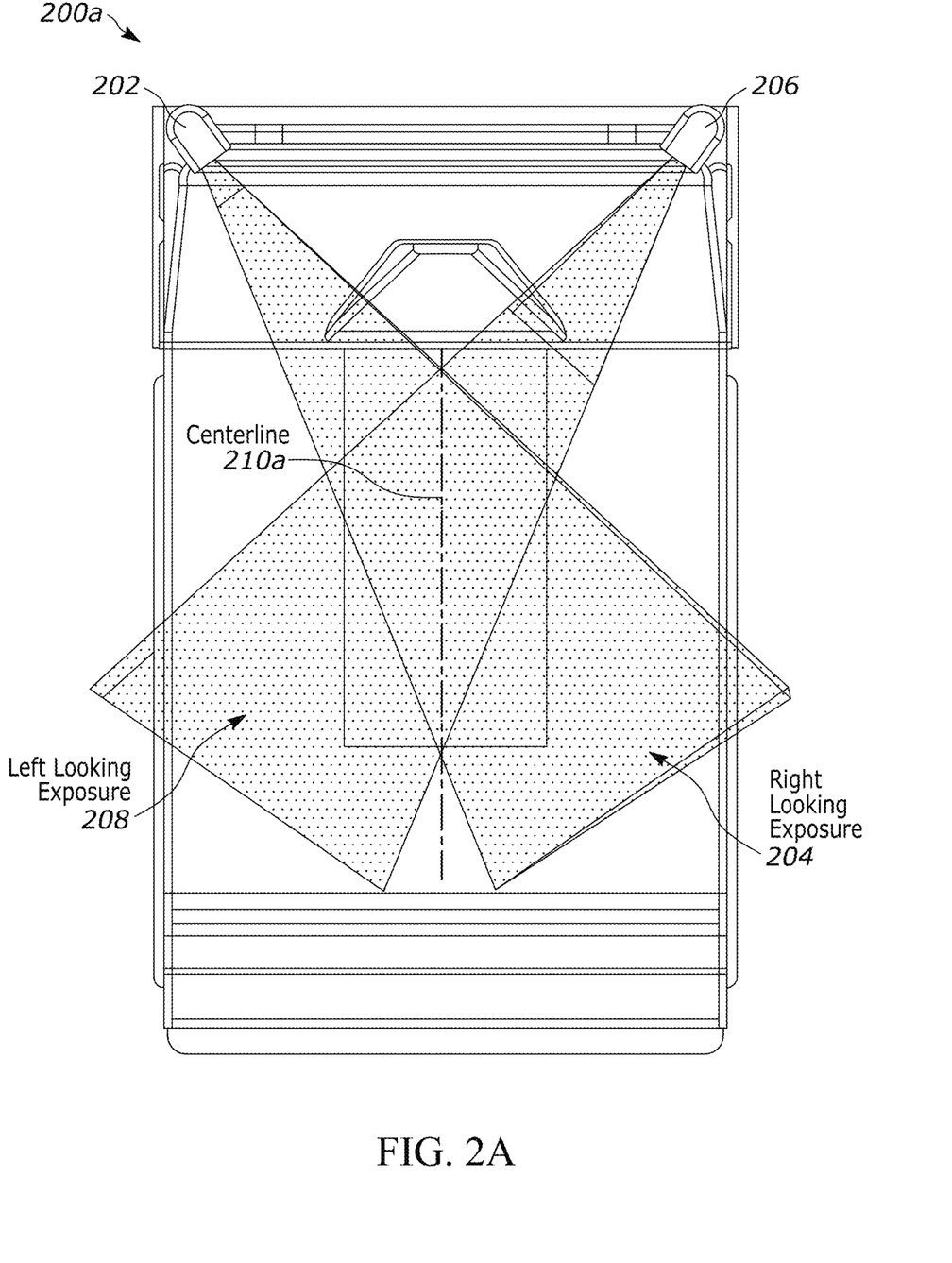
FIG. 2A illustrates a perspective view of a bi-optic barcode reader, in accordance with some embodiments described herein.

Referring now to FIG. 2A, a bi-optical, or "bi-optic", barcode reader 200*a* includes a first imaging sensor 202 corresponding to a first field of view (FOV) 204 and a second imaging sensor 206 corresponding to a second FOV 208. The first FOV 204 may be, for example, directed rightward and the second FOV 208 may be, for example, directed leftward. The bi-optic barcode reader 200*a* may be associated with a center line 210*a* that bisects the intersection of the first FOV 204 and the second FOV 208. In some embodiments, the center line 210*a* may be a plane that bisects the first FOV 204 and the second FOV 208.

Figure 2B:
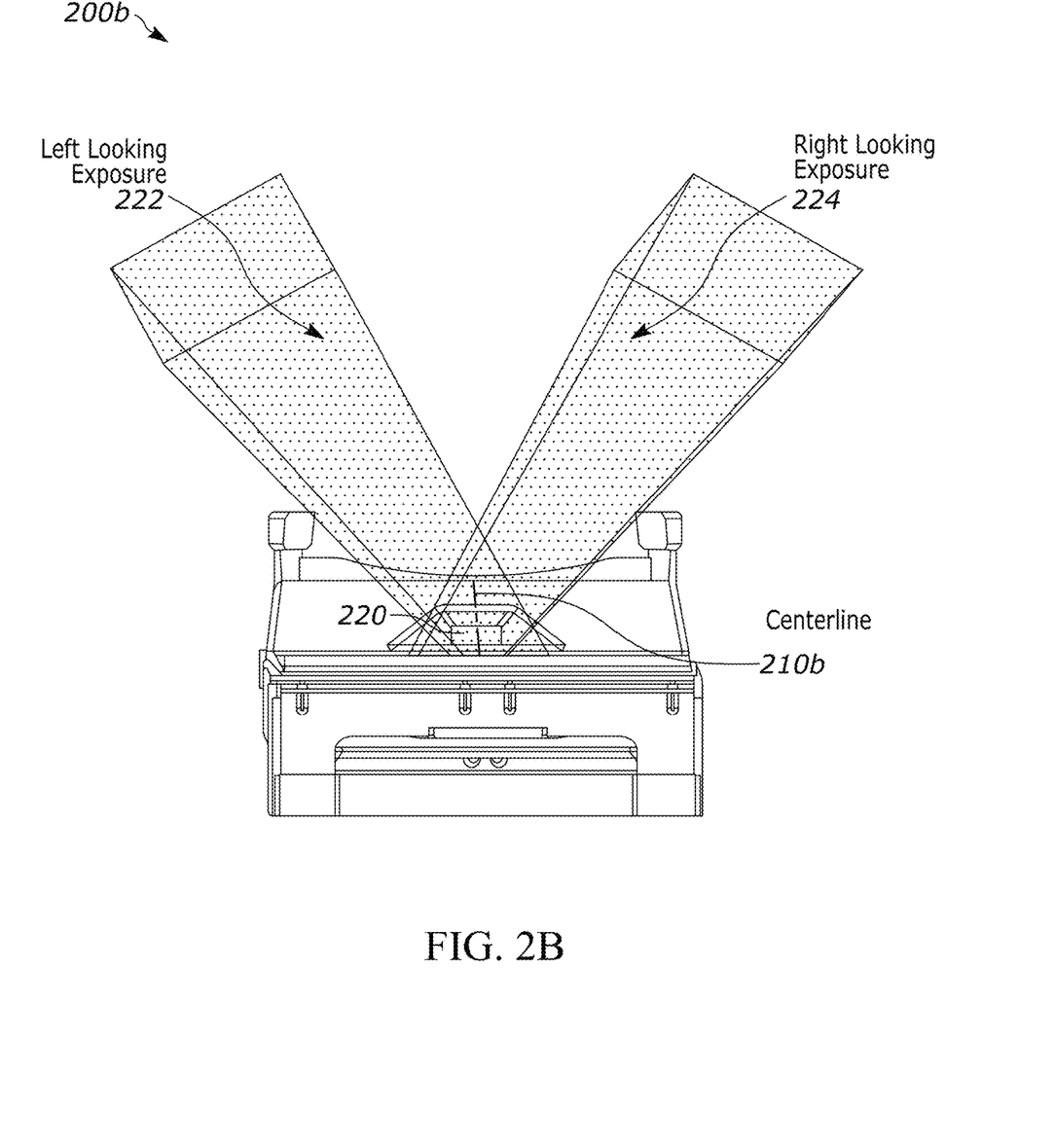
FIG. 2B illustrates another perspective view of a bi-optic barcode reader, in accordance with some embodiments described herein.

Referring now to FIG. 2B, a bi-optic barcode reader 200*b* includes a split view imaging sensor 220 with a first field of view (FOV) 222 and a second FOV 224. In some embodiments, the split view imaging sensor 220 may include one or more concave or convex mirrors that split the FOV of the split view imaging sensor 220 into two distinct FOVs (e.g., the FOV 222 and the FOV 224). The first FOV 222 may be directed leftward and the second FOV 224 may be directed rightward. In some embodiments, the split view imaging sensor 220 may instead be two imaging sensors, each corresponding to the FOV 222 and the FOV 224. The bi-optic barcode reader 200*b* may be associated with a center line 210*b* that bisects the intersection of the first FOV 222 and the second FOV 224. In some embodiments, the center line 210*b* may be a plane that bisects the first FOV 222 and the second FOV 224.

In some embodiments, the bi-optic barcode reader 200*a* and the bi-optic barcode reader 200*b* may be a single barcode reader, and FIG. 2A and FIG. 2B may correspond to two distinct perspective views of a single barcode reader. For example, the single barcode reader may include the first imaging sensor 202, the second imaging sensor 206, and the split view imaging sensor 220 (e.g., or two additional imaging sensors). Continuing with this example, the first FOV 222 and the second FOV 224 of the split view imaging sensor 220 may be a third FOV 222 and a fourth FOV 224, respectively, of the single barcode reader. Further, the single barcode reader may be associated with a center line (e.g., the center line 210*a* and/or the center line 210*b*) that bisects the first FOV 204, the second FOV 208, the third FOV 222, and the fourth FOV 224.

Figure 3:
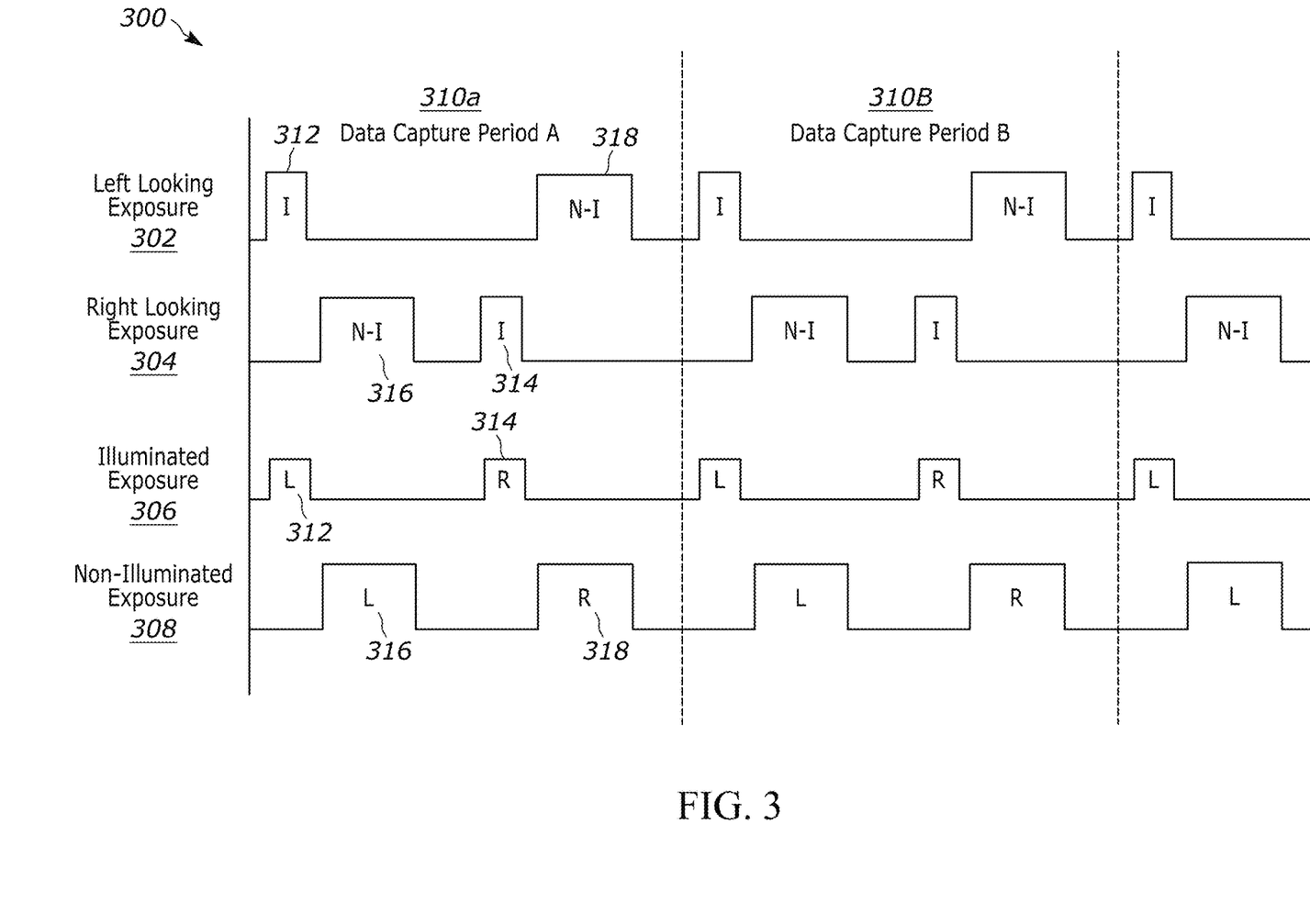
FIG. 3 illustrates a time series diagram associated with an overlapping frame exposure process, in accordance with some embodiments described herein.

FIG. 3 depicts a time-series diagram associated with an exemplary overlapping exposure process 300, in accordance with some embodiments. The exposure process 300 includes a left looking exposure 302, a right looking exposure 304, an illuminated exposure 306, and a non-illuminated exposure 308. The exposure process depicts two distinct data capture periods of a data capture sequence, data capture period 310*a* and data capture period 310*b*. The data capture periods of a data capture sequence may include illuminated exposure periods (e.g., illuminated exposure period 312 and illuminated exposure period 314) and non-illuminated exposure periods (e.g., non-illuminated exposure period 316 and non-illuminated exposure period 318) which correspond to left looking exposure periods (e.g., illuminated exposure period 312 and non-illuminated exposure period 318), and right looking exposure periods (e.g., non-illuminated exposure period 316 and illuminated exposure period 314). For example, during an illuminated exposure period, one or more illuminations sources (e.g., the one or more illumination sources 142 of FIG. 1) may illuminate a FOV associated with the left looking exposure 302 or the right looking exposure 304, and one or more imaging sensors (e.g., the one or more imaging sensors 140 of FIG. 1) may capture illuminated imaging data corresponding to the FOV. As another example, one or more imaging sensors may capture non-illuminated imaging data corresponding to a FOV associated with the left looking exposure 302 or the right looking exposure 304, during a non-illuminated exposure period over which the one or more illumination sources do not illuminate the FOV.

The exposure process 300 may be implemented by the processors 110, and/or other suitable processors, etc., executing instructions stored on the memories 120 (e.g., instructions from the imaging module 122 of FIG. 1), and/or another suitable non-transitory computer readable medium, etc., described above with respect to FIG. 1, FIG. 2A, and FIG. 2B.

It should be understood that, in some embodiments, capturing illuminated imaging data and capturing non-illuminated imaging data, and/or illuminated exposure periods and non-illuminated exposure periods, may proceed in any suitable order and/or sequence and are not confined to the order depicted in FIG. 3.

Figure 4:
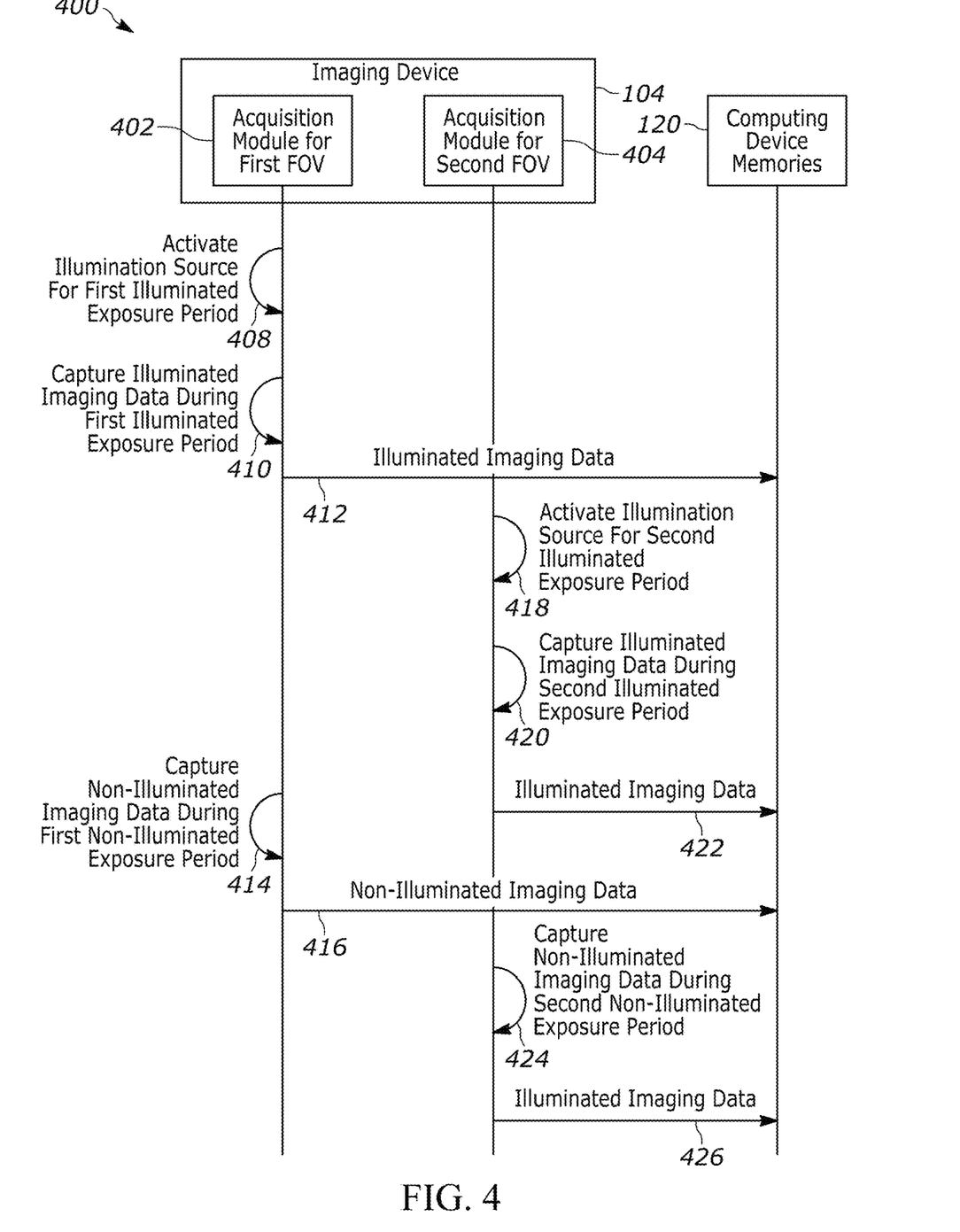
FIG. 4 illustrates a signal diagram associated with an overlapping frame exposure process, in accordance with some embodiments described herein.

FIG. 4 depicts a signal diagram associated with an exemplary overlapping exposure process 400, in accordance with some embodiments. The exposure process 400 includes communication between the imaging device 102 and the computing device memories 120 of FIG. 1. The imaging device 102 may include an acquisition module 402 for a first FOV and an acquisition module 404 for a second FOV. The acquisition module 402 and the acquisition module 404 may include imaging sensors and illumination sources (e.g., the one or more imaging sensors 140 and the one or more illumination sources 142 of FIG. 1).

The exposure process 400 may begin when the acquisition module 402 activates a first illumination source to illuminate the first FOV for a first illuminated exposure period (line 408). The acquisition module 402 may then capture first illuminated imaging data corresponding to the first FOV during the first illuminated exposure period (line 410) and send the first illuminated imaging data to the computing device memories 120 (line 412). The acquisition module 404 may then capture first non-illuminated imaging data corresponding to the first FOV during a first non-illuminated exposure period (line 414), over which the first FOV is not illuminated, and send the first non-illuminated imaging data to the computing device memories 120 (line 416).

The acquisition module 404 may then activate a second illumination source to illuminate the second FOV for a second illuminated exposure period (line 418). The acquisition module 404 may then capture second illuminated imaging data corresponding to the second FOV during the second illuminated exposure period (line 420) and send the second illuminated imaging data to the computing device memories 120 (line 422). The acquisition module 402 may then capture second non-illuminated imaging data corresponding to the second FOV during a second non-illuminated exposure period (line 424), over which the second FOV is not illuminated, and send the second non-illuminated imaging data to the computing device memories 120 (line 426).

In some embodiments, a data capture period may not include a non-illuminated exposure period, and accordingly, non-illuminated imaging data is not captured during such data capture periods. Further, a data capture sequence includes one or more data capture periods (e.g., the data capture period 310a and the data capture period 310b of FIG. 3), and in some embodiments, each data capture period includes a first illuminated exposure period associated with a first FOV, each data capture period includes a second illuminated exposure period associated with a second FOV, and at least one data capture period includes a first non-illuminated exposure period associated with the first FOV. In variations of such embodiments, at least one data capture period includes a second non-illuminated exposure period associated with the second FOV.

It should be understood that, in some embodiments, capturing illuminated imaging data and capturing non-illuminated imaging data may proceed in any suitable order and/or sequence and are not confined to the order depicted in FIG. 4, and that such orders/sequences of capturing illuminated imaging data and non-illuminated imaging data (e.g., data capture sequences) may be repeated any number of times. For example, the second illuminated exposure period may occur after the first illuminated exposure period and before the first non-illuminated exposure period, and/or the second non-illuminated exposure period may occur before or after the first non-illuminated exposure period.

FIG. 5 depicts an exemplary computer-implemented method 500 for implementing the techniques for overlapping exposure of frames disclosed herein, according to an aspect. The method 500 may be implemented by the processors 110, and/or other suitable processors, etc., executing instructions stored on the memories 120, and/or another suitable non-transitory computer readable medium, etc., described above with respect to FIG. 1-4.

In some embodiments, the method 500 may be implemented to perform a data capture sequence including one or more data capture periods (e.g., the data capture periods 310a and 310b of FIG. 3), wherein each data capture period includes a first illuminated exposure period and a second illuminated exposure period, and wherein at least one data capture period includes a first non-illuminated exposure period. In some embodiments, the duration of each capture period is inversely proportional to a framerate of the imaging system. Further, the duration of a data capture period may be defined as approximately one (1) divided by the frame rate of an imaging system with some degree of error (e.g., plus or minus a microsecond, a millisecond, etc.).

The method 500 may begin at block 502 when one or more illumination sources (e.g., the one or more illumination sources 142 of FIG. 1) illuminate a first field of view (FOV) associated with a scanning region of an imaging system for the first illuminated exposure period.

At block 504, one or more imaging sensors (e.g., the one or more imaging sensors 140 of FIG. 1) capture first illuminated imaging data corresponding to the first FOV (e.g., the FOV 204 of FIG. 2A) during the first illuminated exposure period.

At block 506, the one or more imaging sensors capture first non-illuminated imaging data corresponding to the first FOV during a first non-illuminated exposure period over which the one or more illumination sources do not illuminate the first FOV.

At block 508, the one or more illumination sources illuminate a second FOV (e.g., the FOV 208 of FIG. 2A) associated with the scanning region of the imaging system for a second illuminated exposure period.

At block 510, the one or more imaging sensors capture second illuminated imaging data corresponding to the second FOV during the second illuminated exposure period. In some embodiments, the method 500 includes identifying a symbology affixed to an object depicted in: the first illuminated imaging data corresponding to the first FOV, and/or the second illuminated imaging data corresponding to the second FOV; and the method 500 includes decoding the symbology affixed to the object. In some embodiments, the one or more imaging sensors include a single split view imaging sensor (e.g., the split view imaging sensor 220 of FIG. 2B) including a first portion corresponding to the first FOV and a second portion corresponding to the second FOV. In some embodiments, the one or more imaging sensors include a first imaging sensor corresponding to the first FOV (e.g., the imaging sensor 202 of FIG. 2A) and a second imaging sensor corresponding to the second FOV (e.g., the imaging sensor 206 of FIG. 2A).

In some embodiments, at least one data capture period of the data capture sequence includes a second non illuminated exposure period, and the method 500 includes capturing, by the one or more imaging sensors, second non-illuminated imaging data corresponding to the second FOV during the second non-illuminated exposure period over which the one or more illumination sources do not illuminate the second FOV. In some embodiments, the method 500 includes identifying a symbology presented on a display of an external computing device depicted in: the first non-illuminated imaging data corresponding to the first FOV, and/or the second non-illuminated imaging data corresponding to the second FOV; and the method 500 includes decoding the symbology presented on the display of the external computing device. In some embodiments, the one or more imaging sensors are configured to capture imaging data corresponding to the first FOV through a first portion of a window and are configured to capture imaging data corresponding to the second FOV through a second portion of the window. In some embodiments, the first FOV is at least partially oriented towards a first direction and the second FOV is at least partially directed towards a second direction, wherein the first direction is opposite to the second direction. In some embodiments, the second FOV overlaps with the first FOV.

In some embodiments, the method 500 includes one or more additional steps not depicted in FIG. 5. For example, each data capture period of the data capture sequence may include a third illuminated exposure period corresponding to a third FOV, each data capture period may include a fourth illuminated exposure period corresponding to a fourth FOV, etc. Moreover, at least one data capture period may include a non-illuminated exposure period corresponding to a second FOV and/or a non-illuminated exposure period corresponding to the third FOV, etc., Continuing with this example, some embodiments of the method 500 include: illuminating, by the one or more illumination sources, a third FOV (e.g., the FOV 222 of FIG. 2B) associated with the scanning region of the imaging system for the third illuminated exposure period; capturing, by the one or more imaging sensors, third illuminated imaging data corresponding to the third FOV during the third illuminated exposure period; capturing, by the one or more imaging sensors, second non-illuminated imaging data corresponding to the third FOV during the second, or third, non-illuminated exposure period over which the one or more illumination sources do not illuminate the third FOV; illuminating, by the one or more illumination sources, a fourth FOV (e.g., the FOV 224 of FIG. 2B) associated with the scanning region of the imaging system for the fourth illuminated exposure period; and capturing, by the one or more imaging sensors, fourth illuminated imaging data corresponding to the fourth FOV during the fourth illuminated exposure period.

In some embodiments, the one or more imaging sensors include a first imaging sensor, a second imaging sensor, a third imaging sensor, and a fourth imaging sensor respectively corresponding to a first FOV, a second FOV, a third FOV, and a fourth FOV. In variations of this embodiment, the imaging sensors may include one or more split view imaging sensors corresponding to at least two FOV of the first FOV, the second FOV, the third FOV, or the fourth FOV. Further, the one or more imaging sensors may include any suitable configuration/orientation of split view imaging sensors and non-split view imaging sensors. In some embodiments, a symbology (e.g., a physical symbology affixed to an object or a digital symbology presented on a display of an external computing device) passing through the scanning region during the data capture sequence is positioned within a plane within 86 degrees of normal to each of: a first central axis of the first FOV, and a second central axis of the second FOV. In variations of this embodiments, the symbology passing through the scanning region during the data capture sequence is positioned within a plane within 86 degrees of normal to each of: a third central axis of the third FOV, and a fourth central axis of the fourth FOV. In another variation of this embodiment, the symbology is position within a plane within 86 degrees of normal to each of: the first central axis, the second central axis, the third central axis, and the fourth central axis.

In some embodiments, the imaging system comprises an upright window (e.g., as depicted in FIG. 2A), a horizontal window (e.g., as depicted in FIG. 2B), and a center line (e.g., the center lines 210*a* and 210*b* of FIG. 2A and FIG. 2B respectively) perpendicular to the upright window and bisecting the horizontal window. In some embodiments, each of the first FOV, the second FOV, the third FOV, and the fourth FOV are directed towards respective particular sides of an object, and the particular sides of the object include: a side of the object facing the upright window, a side of the object facing the horizontal window, a side of the object right of the center line and parallel to the center line, or a side of the object left of the center line and parallel to the center line. In some embodiments, at least a portion of the scanning region is illuminated by the one or more illumination sources throughout the duration of the data capture sequence. It should also be noted that the techniques similar to those described herein with respect to FIG. 1-5 may be implemented for object recognition applications, machine vision applications, other imaging/scanning applications not explicitly mentioned, etc. It should also be noted that the techniques described herein with respect to FIG. 1-5 may be implemented for any number of fields of view and any configuration of fields of view in a multi-FOV imaging system.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. An imaging system comprising:
one or more illumination sources configured to illuminate two or more fields of view (FOV) associated with a scanning region, the two or more FOV including at least a first FOV and a second FOV;
one or more imaging sensors, configured to capture imaging data, corresponding to the first FOV and the second FOV;
one or more processors; and
one or more memories including computer-executable instructions that, when executed by the one or more processors, cause the imaging system to perform a data capture sequence including one or more data capture periods, wherein:
each data capture period includes a first illuminated exposure period over which the one or more illumination sources illuminate the first FOV and the one or more imaging sensors capture first illuminated imaging data corresponding to the first FOV,
at least one data capture period of the one or more data capture periods includes a first non-illuminated exposure period over which the one or more illumination sources do not illuminate the first FOV and the one or more imaging sensors captures first non-illuminated imaging data corresponding to the first FOV, and
each data capture period includes a second illuminated exposure period over which the one or more illumination sources illuminate the second FOV and the one or more imaging sensors capture second illuminated imaging data corresponding to the second FOV.

2. The imaging system of claim 1, wherein a duration of each data capture period is inversely proportional to a framerate of the imaging system.

3. The imaging system of claim 2, wherein at least one data capture period of the one or more data capture periods includes a second non-illuminated exposure period over which the one or more illumination sources do not illuminate the second FOV and the one or more imaging sensors capture second non-illuminated imaging data corresponding to the second FOV.

4. The imaging system of claim 3, wherein the computer-executable instructions, when executed by the one or more processors, further cause the imaging system to:
identify a symbology presented on a display of an external computing device depicted in: (i) the non-illuminated imaging data corresponding to the first FOV, or (ii) the non-illuminated imaging data corresponding to the second FOV; and
decode the symbology presented on the display of the external computing device.

5. The imaging system of claim 2, wherein the one or more imaging sensors correspond to a third FOV and a fourth FOV and the one or more illumination sources are further configured to illuminate the third FOV and the fourth FOV, and wherein:
each data capture period further includes a third illuminated exposure period over which the one or more illumination sources illuminate the third FOV and the one or more imaging sensors capture third illuminated imaging data corresponding to the third FOV,
at least one of the one or more data capture periods includes a second non-illuminated exposure period over which the one or more illumination sources do not illuminate the third FOV and the one or more imaging sensors captures second non-illuminated imaging data corresponding to the third FOV; and
each data capture period includes a fourth illuminated exposure period over which the one or more illumination sources illuminate the fourth FOV and the one or more imaging sensors capture fourth illuminated imaging data corresponding to the fourth FOV.

6. The imaging system of claim 5, further comprising: an upright window, a horizontal window, and a center line perpendicular to the upright window and bisecting the horizontal window, and wherein:
each of the first FOV, the second FOV, the third FOV, and the fourth FOV are directed towards respective particular sides of an object, and
the particular sides of the object include: a side of the object facing the upright window, a side of the object facing the horizontal window, a side of the object right of the center line and parallel to the center line, or a side of the object left of the center line and parallel to the center line.

7. The imaging system of claim 1, wherein at least a portion of the scanning region is illuminated by the one or more illumination sources throughout a duration of the data capture sequence.

8. The imaging system of claim 1, wherein the one or more imaging sensors are configured to capture imaging data corresponding to the first FOV through a first portion of a window and capture imaging data corresponding to the second FOV through a second portion of the window.

9. The imaging system of claim 1, wherein the first FOV is at least partially oriented towards a first direction and the second FOV is at least partially oriented towards a second direction, wherein the first direction is opposite to the second direction.

10. The imaging system of claim 1, wherein the second FOV overlaps with the first FOV.

11. The imaging system of claim 1, wherein the computer-executable instructions, when executed by the one or more processors, further cause the imaging system to:
identify a symbology affixed to an object depicted in: (i) the illuminated imaging data corresponding to the first FOV, or (ii) the illuminated imaging data corresponding to the second FOV; and
decode the symbology affixed to the object.

12. The imaging system of claim 1, wherein the one or more imaging sensors include a single split view imaging sensor including a first portion corresponding to the first FOV and a second portion corresponding to the second FOV.

13. The imaging system of claim 1, wherein the one or more imaging sensors include a first imaging sensor corresponding to the first FOV and a second imaging sensor corresponding to the second FOV.

14. The imaging system of claim 1, wherein a symbology passing through the scanning region during the data capture sequence is positioned within a plane within 86 degrees of normal to each of: a first central axis of the first FOV, and a second central axis of the second FOV.

15. A computer-implemented method for performing a data capture sequence including one or more data capture periods, comprising:
during each of the one or more data capture periods:
illuminating, by one or more illumination sources, a first field of view (FOV) associated with a scanning region of an imaging system for a first illuminated exposure period;

capturing, by one or more imaging sensors, first illuminated imaging data corresponding to the first FOV during the first illuminated exposure period;

illuminating, by the one or more illumination sources, a second FOV associated with the scanning region of the imaging system for a second illuminated exposure period; and capturing, by the one or more imaging sensors, second illuminated imaging data corresponding to the second FOV during the second illuminated exposure period; and during at least one data capture period of the one or more data capture periods:

capturing, by the one or more imaging sensors, first non-illuminated imaging data corresponding to the first FOV during a first non-illuminated exposure period over which the one or more illumination sources do not illuminate the first FOV.

16. The computer-implemented method of claim 15, further comprising:

during at least one data capture period of the one or more data capture periods:

capturing, by the one or more imaging sensors, second non-illuminated imaging data corresponding to the second FOV during a second non-illuminated exposure period over which the one or more illumination sources do not illuminate the second FOV.

17. The computer-implemented method of claim 16, further comprising:

identifying, by one or more processors, a symbology presented on a display of an external computing device depicted in: (i) the first non-illuminated imaging data corresponding to the first FOV, or (ii) the second non-illuminated imaging data corresponding to the second FOV; and decoding, by the one or more processors, the symbology presented on the display of the external computing device.

18. The computer-implemented method of claim 15, further comprising:

during each of the one or more data capture periods:

illuminating, by the one or more illumination sources, a third FOV associated with the scanning region of the imaging system for a third illuminated exposure period;

capturing, by the one or more imaging sensors, third illuminated imaging data corresponding to the third FOV during the third illuminated exposure period;

illuminating, by the one or more illumination sources, a fourth FOV associated with the scanning region of the imaging system for a fourth illuminated exposure period; and capturing, by the one or more imaging sensors, fourth illuminated imaging data corresponding to the fourth FOV during the fourth illuminated exposure period; and during at least one data capture period of the one or more data capture periods:

capturing, by the one or more imaging sensors, second non-illuminated imaging data corresponding to the third FOV during a second non-illuminated exposure period over which the one or more illumination sources do not illuminate the third FOV.

19. The computer-implemented method of claim 15, further comprising:

identifying, by one or more processors, a symbology affixed to an object depicted in: (i) the first illuminated imaging data corresponding to the first FOV, or (ii) the second illuminated imaging data corresponding to the second FOV; and decoding, by the one or more processors, the symbology affixed to the object.

20. A non-transitory computer readable medium containing program instructions, for performing a data capture sequence including one or more data capture periods, that when executed, cause a computer to:

during each of the one or more data capture periods:

illuminate, by one or more illumination sources, a first FOV associated with a scanning region of an imaging system for a first illuminated exposure period;

capture, by one or more imaging sensors, first illuminated imaging data corresponding to the first FOV during the first illuminated exposure period;

illuminate, by the one or more illumination sources, a second FOV associated with the scanning region of the imaging system for a second illuminated exposure period; and capture, by the one or more imaging sensors, second illuminated imaging data corresponding to the second FOV during the second illuminated exposure period; and during at least one data capture period of the one or more data capture periods:

capture, by the one or more imaging sensors, non-illuminated imaging data corresponding to the first FOV during a first non-illuminated exposure period over which the one or more illumination sources do not illuminate the first FOV.

\* \* \* \* \*